United States Patent [19]

Oldham

[11] Patent Number: 5,489,066
[45] Date of Patent: Feb. 6, 1996

[54] PESTICIDE SPRAY SYSTEM

[76] Inventor: Michael J. Oldham, P.O. Box 392 (c/o Advanced Pest Control), Lemoore, Calif. 93245

[21] Appl. No.: 304,549

[22] Filed: Sep. 12, 1994

[51] Int. Cl.⁶ ........................................... B05B 3/18
[52] U.S. Cl. ........................ 239/745; 239/722; 43/900
[58] Field of Search ........................ 239/172, 175, 239/743, 744, 745, 195–198, 279; 242/398, 403, 403.1; 248/75, 80; 43/124, 125, 131, 132.1, 900

[56] References Cited

U.S. PATENT DOCUMENTS 5,020,730  6/1991  Perroud et al. ................. 239/745

FOREIGN PATENT DOCUMENTS

| | | | |
|---|---|---|---|
| 2255010 | 8/1975 | France ................... | 239/745 |
| 2468302 | 5/1981 | France ................... | 239/745 |
| 2573618 | 5/1986 | France ................... | 239/745 |
| 2810718 | 9/1979 | Germany ................ | 239/745 |
| 3049436 | 10/1981 | Germany ................ | 239/745 |
| 4-141038 | 5/1992 | Japan .................... | 43/900 |
| 6-225678 | 8/1994 | Japan .................... | 43/900 |

*Primary Examiner*—Andres Kashnikow
*Assistant Examiner*—Lesley D. Morris
*Attorney, Agent, or Firm*—John R. Duncan; Frank D. Gilliam

[57] ABSTRACT

A system for thoroughly spraying buildings with a pesticide. A truck carries a tank of liquid pesticide, a hose on a reel and a pump for pumping pesticide into the hose. A cart including a tube having a first end for connection to the hose and a second end carrying one or more spray heads is placed at the far end of a building with the hose extending the length of the building and out a door to the truck. The tube is mounted on at least two wheels, with a sled member supporting the end of the tube adjacent to the hose connection. The spray heads produce a pattern in approximately a vertical plane perpendicular to the length of the tube and hose. As the hose is reeled up, the cart is pulled across the floor of the building, with the fan-like spray pattern fully treating the building interior.

18 Claims, 1 Drawing Sheet

PESTICIDE SPRAY SYSTEM

BACKGROUND OF THE INVENTION

This invention relates in general to apparatus for spraying liquids and, more specifically, to systems for thoroughly spraying the interiors of barns which house chickens or other animals with a pesticide while protecting persons operating the spray system and the environment.

A wide variety of spraying devices have been developed for spraying a variety of liquids. Most common, probably, are the spray or sprinkler systems used to irrigate lawns, orchards, crops and the like. Generally, a circular spray pattern is used, although spray heads producing other patterns have been developed. Some sprayers are mounted on carts, generally with two or four wheels, for ease of movement from one place to another. Some are self-propelled, often by the water being sprayed. These spray systems are very efficient for irrigation and similar purposes. They are, however, often not capable of effectively meeting certain specialized spraying requirements.

It is frequently desirable, and sometimes required by law, to spray barns and barn-like buildings housing chickens or other farm animals with a pesticide to eliminate various insect infestations, diseases, etc. Since the required pesticides are generally toxic to the farm animals and humans, the animals must be removed during spraying and humans must wear suitable protective clothing and generally must stay out of the building during the actual spraying. Further, a minimum quantity of pesticide capable of producing the desired result must be used, necessitating very efficient spraying, and escape of the pesticide into the environment must be severely limited.

Pesticide spraying has been done in the past using sprayers carried by a person wearing protective gear. With large buildings, the person may drive a vehicle that carries the needed pesticide tank, pumping equipment and sprayers. Significant exposure of the operator to the pesticide may occur despite the use of protective clothing, respirators and the like. Regulations now severely limit exposure of such persons to many pesticides. Further, the persons clothing, the vehicle, etc., becomes coated with the pesticide, resulting in a severe decontamination problem upon completion of spraying. Simply hosing off the equipment is not permitted because to the inherent spreading of the pesticide and the possibility of the pesticide entering the ground water, reaching wells, etc.

Thus, there is a continuing need for improved apparatus for spraying barn-like buildings with pesticides that reduce the exposure of persons and the environment outside the building to the pesticides, that uniformly and completely spray the building interior, that is simple and easily transportable, that greatly reduces contamination of spray equipment so as to significantly reduce decontamination requirements and does not require highly skilled personnel for reliable and safe operation.

SUMMARY OF THE INVENTION

The above noted problems, and others, are overcome in accordance with this invention by a pesticide spray system for use with barn-like buildings which basically comprises a vehicle carrying a pesticide tank and a reel of hose, where the reel allows the hose to be unreeled and provides powered reeling, with a cart mounted spray assembly connected to the end of the hose.

The cart basically includes a tube having a first end adapted to be connected to the end of the hose, preferably with a quick-disconnect connector, and a shut off valve. The tube preferably has a straight section extending from the tube to an intermediate area where a wheel assembly is fastened to the tube. The second end of the tube is preferably bent in a generally "S" shaped manner so that the second tube end is elevated above the ground and extends generally parallel to the ground in an aft direction.

The wheel assembly may include two or more wheels equally spaced on both sides of the tube. For best results, two wheels are provided, each mounted on an axle extending outwardly of the tube, at an angle toward the second end of the tube. The axle is stiff but springy, providing a torsion bar type springing to the assembly. The axle ends opposite the wheels are secured to a plate which is preferably held to the tube by means of one or more studs welded to the tube that extend through the plate and are held thereto by wingnuts or the like for ease of assembly and disassembly.

A small sled member is secured on short mounts below the first end of the tube. The mounts space the sled about 1.5 to 2 inches below the tube. The sled and mounts keep the connection between first tube end and hose above the ground and relatively clean. The sled is formed from a suitable material, such as steel, aluminum or stainless steel and has a length preferably of from about 8 to 12 inches and a width of from about 3 to 4 inches. The end extending in the direction of the hose is preferably upturned slightly to aid in sliding over sand or rough ground.

This sled arrangement is of considerable importance for accurate and reliable tracking of the sled when the cart is pulled along the floor of a building by the hose. I have found that when a wheel is used in place of the sled, the cart tends to veer to the side, reducing the accuracy and completeness of spraying. Further, where there are center poles in the building, and the cart must be pulled past the poles with little clearance, a fully wheeled cart often veers sufficiently to become caught by a pole, requiring a person in full protective clothing to enter and straighten the hose and cart.

The second end of the tube carries any suitable spray head or heads to produce the desired spray pattern. Excellent results are obtained with the use of BoomJet spray heads from Teejet Spraying Systems, Inc. and the Model 169 Parkway head from Thompson. The spray heads are oriented to spray in a vertical plane approximately perpendicular to a vertical plane through the tube (and, generally, a vertical plane through the length of the hose) or in a shallow cone oriented aft of the cart. This provides the optimum pattern without allowing excessive spray to exit the building door as the cart reaches the end of its travel. For the purposes of this application, the "approximately vertical plane" will be understood to include a spray from slightly forward of such a plane to significantly aft of that plane, typically at an angle of up to about 30° aft of that plane.

For optimum results, two vertically oriented spray heads are used. The lower head has orifices directing spray low and to the sides (or slightly aft) with the upper spray head having orifices directing spray in an overhead fan shape.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
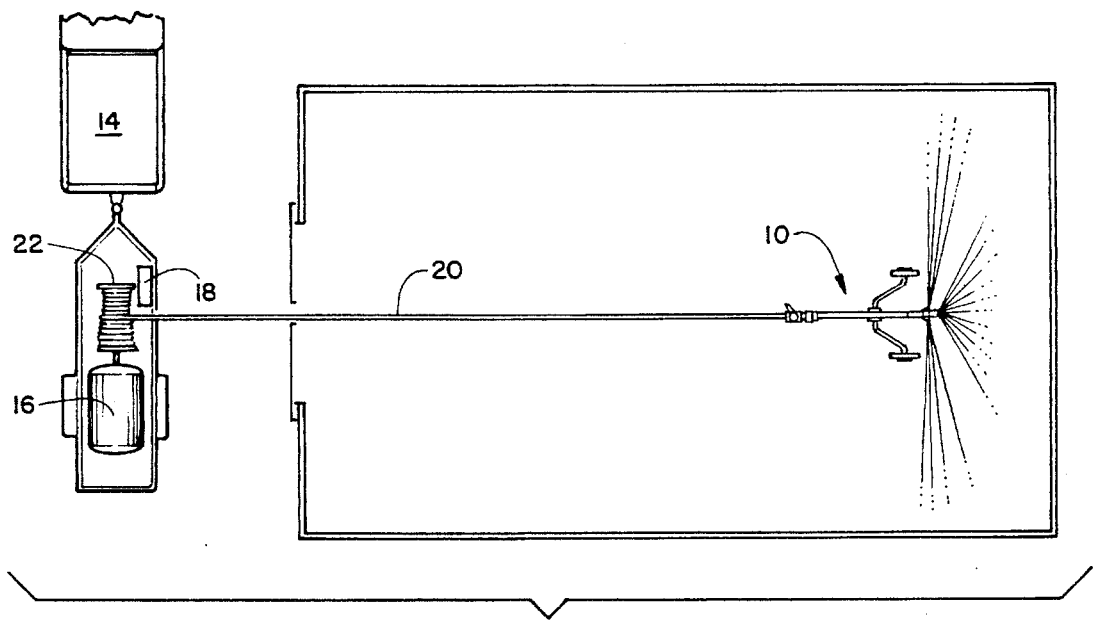
FIG. 1 is a schematic plan view of the spray system in use with a building.

As seen from above in FIG. 1, the spray cart assembly 10 is being used to spray the interior of a barn-like building 12. All chickens or other animals have been removed from building 12. A truck 14 is parked outside a door or other opening into building 12. Truck 14 carries a tank 16 containing pesticide in the proper concentration for spraying. Any suitable pesticide may be used. Formaldehyde is a typical pesticide used with chicken houses to eliminate salmonella SP and various other bacteria and organisms.

A pump 18 is provided to pump pesticide from tank 16 into a hose 20 wound on a reel 22. Reel 22 includes a clutch allowing hose 20 to be manually unreeled to the far end of building 12. After spraying has begun, reel 22 is powered to reel up hose 20 at a selected rate.

Figure 2:
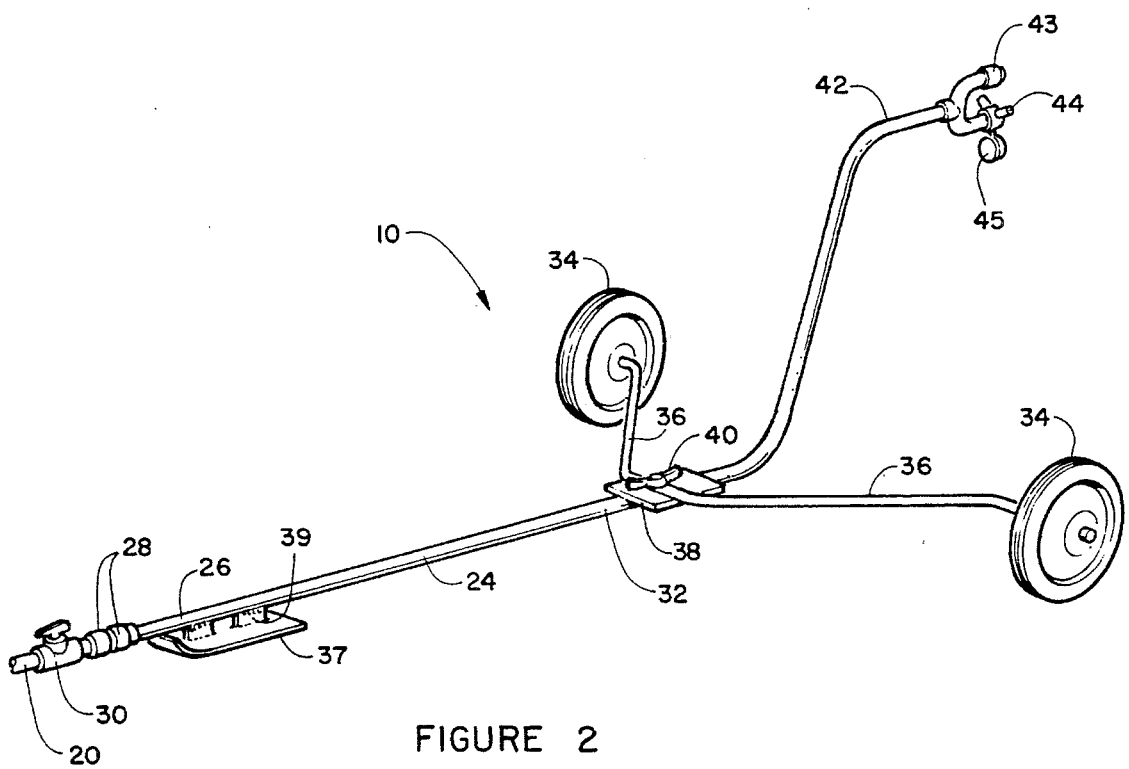
FIG. 2 is a perspective view of the spray assembly cart of this invention.

As seen in FIGS. 1 and 2, spray cart assembly 10 includes a tube 24 which serves as a pesticide conduit and as the main structural member of cart 10. Tube 24 may be formed from any suitable material such as a metal, typically stainless steel or aluminum, a fiber reinforced composite material or any combination thereof. Tube 24 may have any suitable diameter with stainless steel, a tube having an internal diameter of about 0.75 inch is preferred. In most cases, stainless steel is preferred for an optimum combination of strength, resistance to chemical attack by pesticides and ease of cleaning. Typically, cart 10 may have a length of about 48 to 60 inches and a width of about 32 to 36 inches, with the spray head carrying end about 30 to 40 inches above the ground when in use.

At first end 26 of tube 24 there is provided a connection to the end of hose 20. While any suitable connection, such as a conventional threaded connection, may be used, for maximum efficiency and ease of hooking up and unhooking, a conventional "quick disconnect" fitting is preferred. A valve 30 is preferably provided at the end of hose 20 so that the hose can be closed off without draining the hose when the cart tube is separated therefrom.

Tube 24 preferably has a straight section extending from first end 26 to a central or intermediate location 32. The straight section will lie along the same line as hose 20 when the hose is being reeled up.

An assembly comprising two wheels 34 and two axles 36 fastened to a plate 38 is secured to the central location 32 of tube 24. The ends of axles 36 may be welded to plate 38. If desired, axles 36 could be bent from one length of rod, which is then secured to plate 38 in any suitable manner, such as clamps or welding. Axles 36 are formed from a suitable material, such as stainless steel, and have diameters selected to provide the required support for the assembly while remaining slightly springy to absorb shock as the assembly rolls over a possibly uneven building floor, which may be concrete, dirt or sand. While more than two wheels 34 could be used, two are preferred for optimum tracking.

A small sled 37 is mounted on tube 24 through supports 39, which are preferably welded thereto. Sled 37 is parallel to tube 24 and has an upturned front edge to ride over rough or sandy floors. As described above, the sled causes the cart to track much better than is the case with a front wheel.

Plate 38 is preferably fastened to tube 24 by one or more studs welded to tube 24 and extending up through holes in plate 38 with the plate held in place by wingnuts. In order to prevent twisting of plate 38 in a horizontal plane during use, preferably either two studs and wingnuts 40 or a combination of one stud/wingnut 40 set and an index pin (not shown) welded to tube 24 and extending into a corresponding hole in plate 38 could be used.

Tube 24 is curved in a generally "S" shape between central section 32 and second end 42 to raise the second end above the floor and leave the end pointing aft. Any suitable spray head or heads 44 may be secured to second end 42. For best results, spray heads will provide a semi-circular, fan-like, spray pattern in a vertical plane approximately perpendicular to a vertical plane through tube 24. Ideally, the spray pattern will be a very shallow cone, up to about 30° aft of that plane.

For optimum uniformity, two spray heads 44 are used, one above the other. The lower spray head 45 will spray one stream approximately horizontally to each side, and one or more streams each at slight increasing angles above the horizontal. The upper spray head 45 will spray a plurality of streamrover the arc between the uppermost streams provided by the lower head. This arrangement assures complete coating of the interior of the building.

In operation, all chickens or other animals are removed from building 12. Spray cart assembly 10 is placed at the end of the building opposite a door or other opening. Hose 20 is unreeled and attached to tube 24 at connection 28. Valve 30 is opened, everyone in the building leaves and pump 18 is turned on to begin feeding pesticide from tank 16 to the spray heads 44. Reel 22 is operated to slowly reel in hose 20 at a selected rate. Cart 10 is pulled across the floor of building 12 at the desired rate, with sled 37 causing the cart to track precisely with the hose.

When the end of the building is reached, pump 18 is turned off. A person in suitable protective clothing turns hose end valve 30 off and disconnects cart 10 from hose 12. Any required rinsing or other decontamination of the end of the hose is accomplished and the hose is wound on reel 22. Wingnuts 40 are removed, disconnecting the wheel assembly from tube 24. Cart 10 is decontaminated (or placed in a suitable enclosure) and placed on truck 14, which is ready to proceed to the next job.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A pesticide spray system which comprises:

a vehicle;

a tank for containing pesticide mounted on said vehicle;

a reel carrying an elongated hose wound thereon;

means for permitting said hose to be unreeled and for reeling up said hose;

a cart comprising an elongated tube having a first end and a second end;

means for connecting said hose to said first tube end;

at least two spaced, generally parallel, wheels mounted on at least one axle secured to said tube at a location intermediate said first and second ends for supporting said tube;

a sled means secured to said tube adjacent to said first tube end to support said first end; and spray means connected to said second tube end for receiving liquid from said tube and spraying said liquid in a plane approximately perpendicular to a vertical plane through said tube;

whereby said cart and unreeled hose may be placed in the interior of a building and the building interior may be sprayed with a liquid while winding said hose onto said reel to pull said cart through said building.

2. The pesticide spray system according to claim 1 wherein:

said at least one axle between said tube and each of said at least two wheels is angled outwardly from said tube and toward said second end of said tube;

said at least one axle is secured to a plate having at least one hole therethrough;

at least one stud is secured to said tube for extending through said at least one hole; and a nut is provided for said at least one stud to secure said plate over said at least one stud and to said tube.

3. The pesticide spray system according to claim 1 wherein said cart has a length of from about 48 to 60 inches, a height of from about 30 to 40 inches and a width of from about 32 to 36 inches.

4. The pesticide spray system according to claim 1 wherein said sled means is mounted on a plurality of support means extending between said sled means and said tube and said sled includes an upturned end extending toward said first tube end.

5. The pesticide spray system according to claim 1 wherein a first portion of said tube is substantially straight from said first end to said intermediate location and said second end of said tube is bent upward in a generally "S"-curve, with a portion of said tube at said second end lying generally parallel to said first tube portion.

6. The pesticide spray system according to claim 1 wherein said spray means comprises at least two spray heads provided at said second tube end, including a lower spray head including means for directing spray to the sides of said cart generally parallel to the building floor to an angle of up to about 60° above the floor and an upper spray head for directing spray across a fan-shaped arc between the spray from said lower spray head.

7. A pesticide spray assembly which comprises:

an elongated tube having a first end and a second end;

means for connecting a hose to said first end;

at least two spaced, generally parallel, wheels mounted on at least one axle secured to said tube at a location intermediate said first and second ends for supporting said tube;

a sled means secured to said tube adjacent to said first tube end to support said first end; and spray means connected to said second tube end for receiving liquid from said tube and spraying said liquid in a plane approximately perpendicular to a vertical plane through said tube.

8. The pesticide spray assembly according to 7 claim wherein:

said at least one axle between said tube and each of said at least two wheels is angled outwardly from said tube and toward said second end of said tube;

said at least one axle is secured to a plate having at least one hole therethrough;

at least one stud is secured to said tube for extending through said at least one hole; and a nut is provided for said at least one stud to secure said plate over said at least one stud and to said tube.

9. The pesticide spray assembly according to claim 7 wherein said sled means has a length of from about 8 to 12 inches and a width of from about 3 to 4 inches.

10. The pesticide spray assembly according to claim 7 wherein a first portion of said tube is substantially straight from said first end to said intermediate location and said second end of said tube is bent upward in a generally "S"-curve, with a portion of said tube at said second end lying generally parallel to said first tube portion.

11. The pesticide spray assembly according to claim 7 wherein said spray means comprises at least two spray heads provided at said second tube end, including a lower spray head including means for directing spray to the sides of said cart generally parallel to the building floor to an angle of up to about 60° above the floor and an upper spray head for directing spray across a fan-shaped arc between the spray from said lower spray head.

12. The pesticide spray system according to claim 7 wherein said sled means is mounted on a plurality of support means extending between said sled means and said tube and said sled includes an upturned end extending toward said first tube end.

13. The pesticide spray system according to claim 12 wherein said sled means has a length of about 8 to 12 inches, a width of from about 3 to 4 inches and said support means have lengths of from about 1.5 to 2 inches.

14. A pesticide spray assembly which comprises:

an elongated tube having a first end and a second end;

means for connecting a hose to said first end;

at least two spaced, generally parallel, wheels mounted on at least one axle secured to said tube at a location intermediate said first and second ends for supporting said tube;

a sled means secured to said tube adjacent to said first tube end to support said first end;

said sled means being mounted on a plurality of support means extending between said sled means and said tube;

said sled means including an upturned end extending toward said first tube end; and spray means connected to said second tube end for receiving liquid from said tube and spraying said liquid in a plane approximately perpendicular to a vertical plane through said tube.

15. The pesticide spray system according to claim 14 wherein said sled means has a length of about 8 to 12 inches, a width of from about 3 to 4 inches and said support means have lengths of from about 1.5 to 2 inches.

16. The pesticide spray assembly according to 13 claim wherein:

said at least one axle between said tube and each of said at least two wheels is angled outwardly from said tube and toward said second end of said tube;

said at least one axle is secured to a plate having at least one hole therethrough;

at least one stud is secured to said tube for extending through said at least one hole; and a nut is provided for said at least one stud to secure said plate over said at least one stud and to said tube.

17. The pesticide spray assembly according to claim 13 wherein a first portion of said tube is substantially straight from said first end to said intermediate location and said second end of said tube is bent upward in a generally "S"-curve, with a portion of said tube at said second end lying generally parallel to said first tube portion.

18. The pesticide spray assembly according to claim 13 wherein said spray means comprises at least two spray heads provided at said second tube end, including a lower spray head including means for directing spray to the sides of said cart generally parallel to the building floor to an angle of up to about 60° above the floor and an upper spray head for directing spray across a fan-shaped arc between the spray from said lower spray head.

* * * * *